(No Model.)
F. M. KING.
COMBINED FERTILIZER DISTRIBUTER AND SEEDER.
No. 284,562. Patented Sept. 4, 1883.
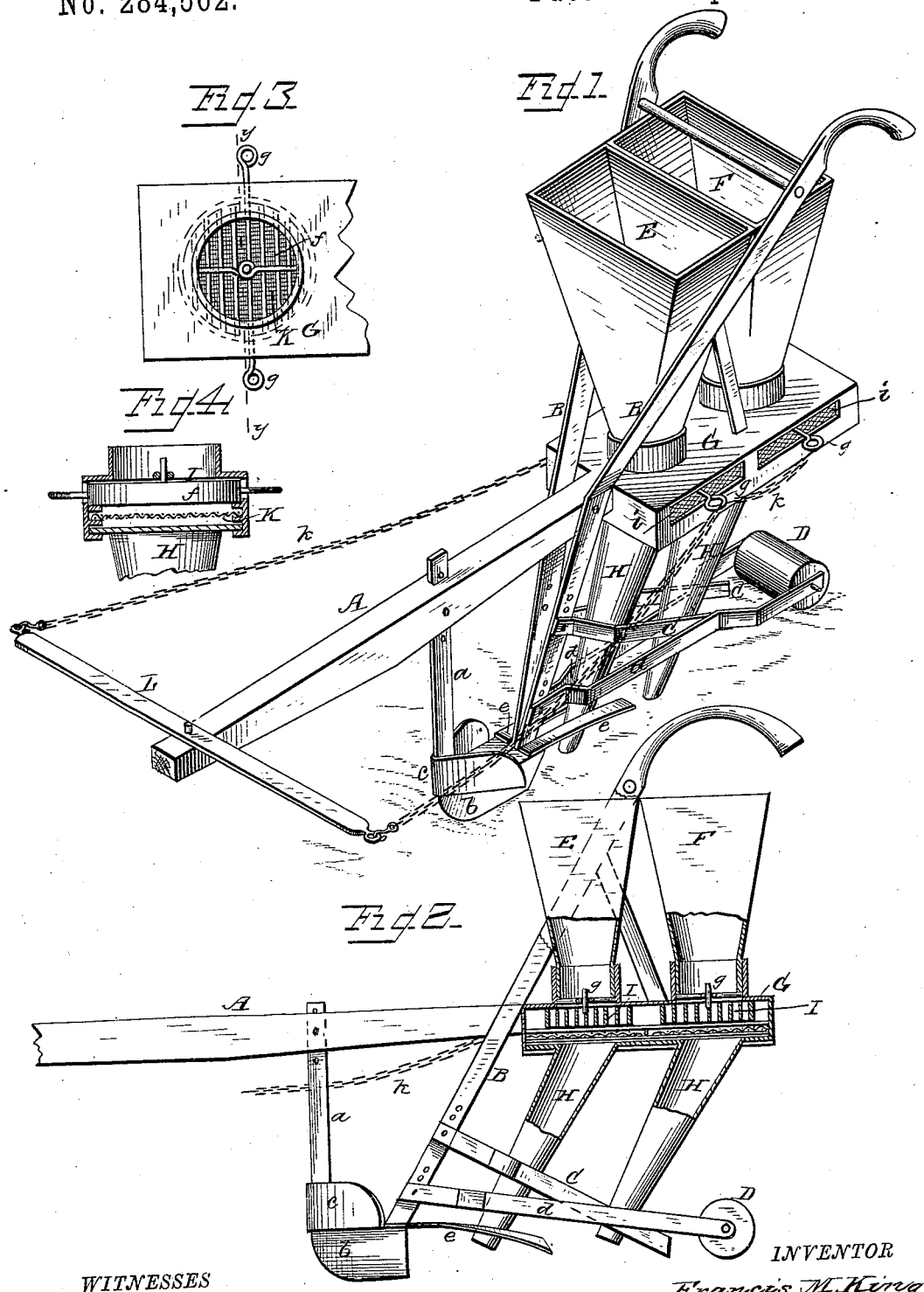
WITNESSES
F. L. Ourand
N. E. Oliphant
INVENTOR
Francis M. King,
per Chas. H. Fowler
Attorney

UNITED STATES PATENT OFFICE.

FRANCIS M. KING, OF WILMINGTON, NORTH CAROLINA.

COMBINED FERTILIZER-DISTRIBUTER AND SEEDER.

SPECIFICATION forming part of Letters Patent No. 284,562, dated September 4, 1883.

Application filed May 8, 1883. (No model.)

*To all whom it may concern:*

Be it known that I, FRANCIS M. KING, a citizen of the United States, residing at Wilmington, in the county of New Hanover and State of North Carolina, have invented certain new and useful Improvements in a Combined Fertilizer-Distributer and Seeder; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a side elevation thereof, partly in section; Fig. 3, a top plan view in detail of a portion of the frame, showing the agitator and wire-gauze plate; and Fig. 4, a cross-section taken on line $y$ $y$ of Fig. 3.

The present invention has relation to certain new and useful improvements in a combined fertilizer-distributer and seeder, which may be operated jointly or independently; and the object thereof is to provide means whereby the fertilizer or seed is prevented from clogging and the fertilizer from working into a pasty consistency, and the lumps effectually reduced to the required fineness, thus avoiding the necessity of the employment of the usual stirrer, the weight of the mass being moved bodily in a horizontal direction, and thus sufficiently agitated. These several objects I attain by the construction substantially as shown in the drawings, and hereinafter described and claimed.

In the accompanying drawings, A represents the usual plow-beam, and $a$ the standard adjustably connected thereto, said standard having a drill or furrow-opener, $b$, and plowshare or leveler $c$.

The handles B are suitably connected to the beam A, and extend down to the drill $b$, said handles having adjustably connected to them the coverers C and arms $d$, the latter carrying the roller D. The drill or furrow-opener $b$ has the coverers $e$, for the purpose of covering the fertilizer immediately preceding the discharge for the seed, and the coverer C in like manner covering the seed in the rear of the fertilizer-discharge, while the roller D acts in the ordinary manner to press down the earth and make it compact.

The hoppers E F are suitably connected to a frame, G, and are respectively the fertilizer and seed hoppers, said frame being made continuous or in sections, one of each section being located under its respective hopper, and having connected to its under side the spouts H.

Within the frame G are located agitators I, consisting of a series of vertically-arranged plates or bars, $f$, and adapted to horizontally vibrate by means hereinafter described. Below the agitators I are arranged or located wire-gauze plates K, which are removable from the frame G for the purpose of substituting plates of finer or coarser mesh, as may be desired, the object thereof being to regulate the discharge of fertilizer or seed into the spouts H. As previously stated, the agitators I are composed of a series of vertically-arranged bars or plates, $f$, disposed parallel with each other on the same horizontal plane. The advantage of this peculiar construction of agitator renders it more effective in its purpose, as the seed or fertilizer, as it passes from the hopper, is lodged between the bars or plates and carried around by the vibratory motion of the agitator over the wire-gauze plate in a given quantity, rendering it less liable to clog or choke up, a sufficient space being left between the agitator and wire-gauze plate to allow the material between the bars or plates to be carried forward and back. The agitators I have each two rods, $g$, extending from the sides and passing out through elongated openings $i$ in the frame G. To the rods $g$ are connected rods, cords, or chains $k$, the opposite ends being attached to the ends of a singletree, L, upon the plow-beam A, thus giving the required motion to the agitators by the draft of the team.

Having now fully described my invention, what I claim as new, and desire to secure by Letters Patent, is—

1. In a fertilizer-distributer or seeder, the combination, with a vibrating agitator consisting of a series of vertical bars or plates arranged parallel with each other, of removable wire-gauze plates arranged under said agitators, substantially as and for the purpose set forth.

2. In a fertilizer-distributer or seeder, the combination, with the hoppers E F and spouts H, of the frame G, located between the same, and containing the agitators I and removable gauze plate K, substantially as and for the purpose specified.

3. In a fertilizer-distributer or seeder, the combination, with the standard $a$, drill $b$, and plowshare or leveler $c$, said drill having the coverers $e$, in combination with the handles B, extending down below the plow-beam, and the coverers C and roller D, substantially as and for the purpose set forth.

In testimony that I claim the above I have hereunto subscribed my name in the presence of two witnesses.

FRANCIS M. KING.

Witnesses:
N. E. OLIPHANT,
M. P. CALLAN.